US012745263B2

(12) United States Patent
Choi et al.

(10) Patent No.: US 12,745,263 B2
(45) Date of Patent: Sep. 22, 2026

(54) METHOD AND DEVICE FOR TRANSMITTING DOWNLINK CONTROL SIGNALS IN SCHEDULING A PHYSICAL CHANNEL

(71) Applicant: LG Electronics Inc., Seoul (KR)

(72) Inventors: Seunghwan Choi, Seoul (KR); Suckchel Yang, Seoul (KR); Seonwook Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 363 days.

(21) Appl. No.: 18/551,120

(22) PCT Filed: Mar. 31, 2022

(86) PCT No.: PCT/KR2022/004639
§ 371 (c)(1),
(2) Date: Sep. 18, 2023

(87) PCT Pub. No.: WO2022/215955
PCT Pub. Date: Oct. 13, 2022

(65) Prior Publication Data

US 2024/0163901 A1 May 16, 2024

(30) Foreign Application Priority Data

Apr. 5, 2021 (KR) ........................ 10-2021-0044116

(51) Int. Cl.
*H04W 72/232* (2023.01)
*H04L 5/00* (2006.01)

(52) U.S. Cl.
CPC ......... *H04W 72/232* (2023.01); *H04L 5/0051* (2013.01)

(58) Field of Classification Search
CPC ........... H04W 72/232; H04W 72/0446; H04W 72/0453; H04W 72/1263; H04L 1/18;
(Continued)

(56) References Cited

U.S. PATENT DOCUMENTS

2019/0082431 A1* 3/2019 Yi ......................... H04L 5/0055
2019/0149288 A1* 5/2019 Hosseini ............... H04L 5/0051
370/329

(Continued)

FOREIGN PATENT DOCUMENTS

EP 3606236 A1 2/2020
JP 2021-503218 A 2/2021

OTHER PUBLICATIONS

"5G; NR; Physical channels and modulation (3GPP TS 38.211 version 16.2.0 Release 16)"; ETSI TS 138 211 V16.2.0 (Jul. 2020) (Year: 2020).*

(Continued)

*Primary Examiner* — Benjamin H Elliott, IV
(74) *Attorney, Agent, or Firm* — Fish & Richardson P.C.

(57) ABSTRACT

A method and a device for transmitting and receiving signals in a wireless communication system, disclosed in the present specification, can transmit and receive multiple physical channels on the basis of DCI. The multiple physical channels include a physical channel to which DMRS is not assigned. With regard to a DMRS-less physical channel, a position configuration method, a TBS determination method, a method for resolving an overlap with another channel, and a PTRS configuration method are disclosed.

12 Claims, 5 Drawing Sheets receiving DCI for scheduling multiple physical channels — S401 transmitting or receiving the multiple physical channels based on the DCI — S403

(58) Field of Classification Search
CPC ... H04L 5/0023; H04L 5/0044; H04L 5/0051; H04L 5/0053; H04L 5/0091
See application file for complete search history.

(56) References Cited

U.S. PATENT DOCUMENTS

| | | | | |
|---|---|---|---|---|
| 2019/0158263 | A1* | 5/2019 | Lee | H04W 52/243 |
| 2020/0112948 | A1* | 4/2020 | Wang | H04W 72/12 |
| 2020/0128521 | A1* | 4/2020 | Tang | H04W 72/23 |
| 2021/0391965 | A1* | 12/2021 | Raghavan | H04L 5/0082 |
| 2021/0392648 | A1* | 12/2021 | Andersson | H04L 5/0044 |
| 2022/0104224 | A1* | 3/2022 | Choi | H04L 5/0094 |
| 2022/0232614 | A1* | 7/2022 | Gao | H04W 72/23 |
| 2022/0322409 | A1* | 10/2022 | Yokomakura | H04L 5/0048 |
| 2022/0346091 | A1* | 10/2022 | Karmoose | H04L 1/0067 |
| 2023/0024437 | A1* | 1/2023 | Zhang | H04W 72/12 |
| 2023/0155747 | A1* | 5/2023 | Choi | H04W 72/23 370/329 |
| 2024/0163901 | A1* | 5/2024 | Choi | H04L 5/0051 |

OTHER PUBLICATIONS

Huawei, HiSilicon, "PDSCH/PUSCH enhancements for 52-71GHz band," R1-2100201, 3GPP TSG RAN WG1, Meeting #104-e, E-meeting, Jan. 25-Feb. 5, 2021, 16 pages.

Notice of Allowance in Japanese Appln. No. 2023-560419, mailed on Aug. 20, 2024, 5 pages (with English translation).

Qualcomm Incorporated, "TB Processing over multi-slot PUSCH," R1-2101478, 3GPP TSG-RAN WG1, Meeting #104e, e-Meeting, Jan. 25-Feb. 5, 2021, 3 pages.

Extended European Search Report in European Appln. No. 22784865.2, mailed on Mar. 3, 2025, 10 pages.

Nokia, Nokia Siemens Networks, "DCI and CCE size," 3GPP TSG RAN WG1 Meeting #51bis, Sevilla, Spain, R1-080297, Jan. 2008, 8 pages.

Office Action in Korean Appln. No. 10-2023-7030793, mailed on Sep. 26, 2025, 8 pages (with English translation).

Qualcomm Incorporated, "PDSCH and PUSCH enhancements for 52.6-71GHz band," 3GPP TSG-RAN WG1 #104-e e-Meeting, R1-2101457, Jan. 2021, 11 pages.

* cited by examiner

METHOD AND DEVICE FOR TRANSMITTING DOWNLINK CONTROL SIGNALS IN SCHEDULING A PHYSICAL CHANNEL

CROSS-REFERENCE TO RELATED APPLICATIONS

This application is a National Stage application under 35 U.S.C. § 371 of International Application No. PCT/KR2022/004639, filed on Mar. 31, 2022, which claims the benefit of Korean Application No. 10-2021-0044116, filed on Apr. 5, 2021. The disclosures of the prior applications are incorporated by reference in their entirety.

TECHNICAL FIELD

The present disclosure relates to a method and apparatus for use in a wireless communication system.

BACKGROUND

Generally, a wireless communication system is developing to diversely cover a wide range to provide such a communication service as an audio communication service, a data communication service and the like. The wireless communication is a sort of a multiple access system capable of supporting communications with multiple users by sharing available system resources (e.g., bandwidth, transmit power, etc.). For example, the multiple access system may include one of code division multiple access (CDMA) system, frequency division multiple access (FDMA) system, time division multiple access (TDMA) system, orthogonal frequency division multiple access (OFDMA) system, single carrier frequency division multiple access (SC-FDMA) system, and the like.

SUMMARY

The object of the present disclosure is to provide a signal transmission and reception method for efficiently transmitting and receiving control and data signals in a wireless communication system and apparatus therefor.

It will be appreciated by persons skilled in the art that the objects that could be achieved with the present disclosure are not limited to what has been particularly described hereinabove and the above and other objects that the present disclosure could achieve will be more clearly understood from the following detailed description.

The present disclosure provides a method and apparatus for transmitting and receiving a signal in a wireless communication system.

In one aspect of the present disclosure, provided herein is a method of transmitting and receiving signals by a terminal in a wireless communication system, the method may include receiving DCI (downlink control channel) for scheduling a plurality of physical channels, wherein a first resource allocated for at least one first physical channel among the plurality of physical channels does not include a demodulation reference signal (DMRS), and a second resource allocated for at least one second physical channel among the plurality of physical channels includes a DMRS, transmitting or receiving the first physical channel on the first resource based on the DCI, and transmitting or receiving the second physical channel on the second resource based on the DCI, wherein a first transport block size (TBS) of the first physical channel is determined based on the number of resource elements (REs) containing data within the first physical channel (N_RE1) and the number of layers of the first physical channel (V1), and wherein a second TBS of the second physical channel is determined based on the number of REs containing data within the second physical channel (N_RE2) and the number of layers of the second physical channel (V2).

In another aspect of the present disclosure, provided herein is a method of transmitting and receiving signals by a base station in a wireless communication system. The method may include transmitting DCI (downlink control channel) for scheduling a plurality of physical channels, wherein a first resource allocated for at least one first physical channel among the plurality of physical channels does not include a demodulation reference signal (DMRS), and a second resource allocated for at least one second physical channel among the plurality of physical channels includes a DMRS, transmitting or receiving the first physical channel on the first resource based on the DCI, and transmitting or receiving the second physical channel on the second resource based on the DCI, wherein a first transport block size (TBS) of the first physical channel is determined based on the number of resource elements (REs) containing data within the first physical channel (N_RE1) and the number of layers of the first physical channel (V1), and wherein a second TBS of the second physical channel is determined based on the number of REs containing data within the second physical channel (N_RE2) and the number of layers of the second physical channel (V2).

In another aspect of the present disclosure, there are provided an apparatus, a processor, and a storage medium for performing the signal transmission and reception method.

The apparatus may include an autonomous driving vehicle communicable with at least a UE, a network, and another autonomous driving vehicle other than the communication apparatus.

The above-described aspects of the present disclosure are only some of the preferred embodiments of the present disclosure, and various embodiments reflecting the technical features of the present disclosure may be derived and understood from the following detailed description of the present disclosure by those skilled in the art.

According to one embodiment of the present disclosure, when control and data signals are transmitted and received between communication devices, the signals may be transmitted and received more efficiently based on operations different from those in the prior art.

It will be appreciated by persons skilled in the art that the effects that can be achieved with the present disclosure are not limited to what has been particularly described hereinabove and other advantages of the present disclosure will be more clearly understood from the following detailed description taken in conjunction with the accompanying drawings.

DETAILED DESCRIPTION

The following technology may be used in various wireless access systems such as code division multiple access (CDMA), frequency division multiple access (FDMA), time division multiple access (TDMA), orthogonal frequency division multiple access (OFDMA), single carrier frequency division multiple access (SC-FDMA), and so on. CDMA may be implemented as a radio technology such as universal terrestrial radio access (UTRA) or CDMA2000. TDMA may be implemented as a radio technology such as global system for mobile communications (GSM)/general packet radio service (GPRS)/enhanced data rates for GSM evolution (EDGE). OFDMA may be implemented as a radio technology such as institute of electrical and electronics engineers (IEEE) 802.11 (wireless fidelity (Wi-Fi)), IEEE 802.16 (worldwide interoperability for microwave access (WiMAX)), IEEE 802.20, evolved UTRA (E-UTRA), and so on. UTRA is a part of universal mobile telecommunications system (UMTS). 3rd generation partnership project (3GPP) long term evolution (LTE) is a part of evolved UMTS (E-UMTS) using E-UTRA, and LTE-advanced (LTE-A) is an evolution of 3GPP LTE. 3GPP new radio or new radio access technology (NR) is an evolved version of 3GPP LTE/LTE-A.

For clarity of description, the present disclosure will be described in the context of a 3GPP communication system (e.g., LTE and NR), which should not be construed as limiting the spirit of the present disclosure. LTE refers to a technology beyond 3GPP TS 36.xxx Release 8. Specifically, the LTE technology beyond 3GPP TS 36.xxx Release 10 is called LTE-A, and the LTE technology beyond 3GPP TS 36.xxx Release 13 is called LTE-A pro. 3GPP NR is the technology beyond 3GPP TS 38.xxx Release 15. LTE/NR may be referred to as a 3GPP system. "xxx" specifies a technical specification number. LTE/NR may be generically referred to as a 3GPP system. For the background technology, terminologies, abbreviations, and so on as used herein, refer to technical specifications published before the present disclosure. For example, the following documents may be referred to.

3GPP NR

Figure 1:
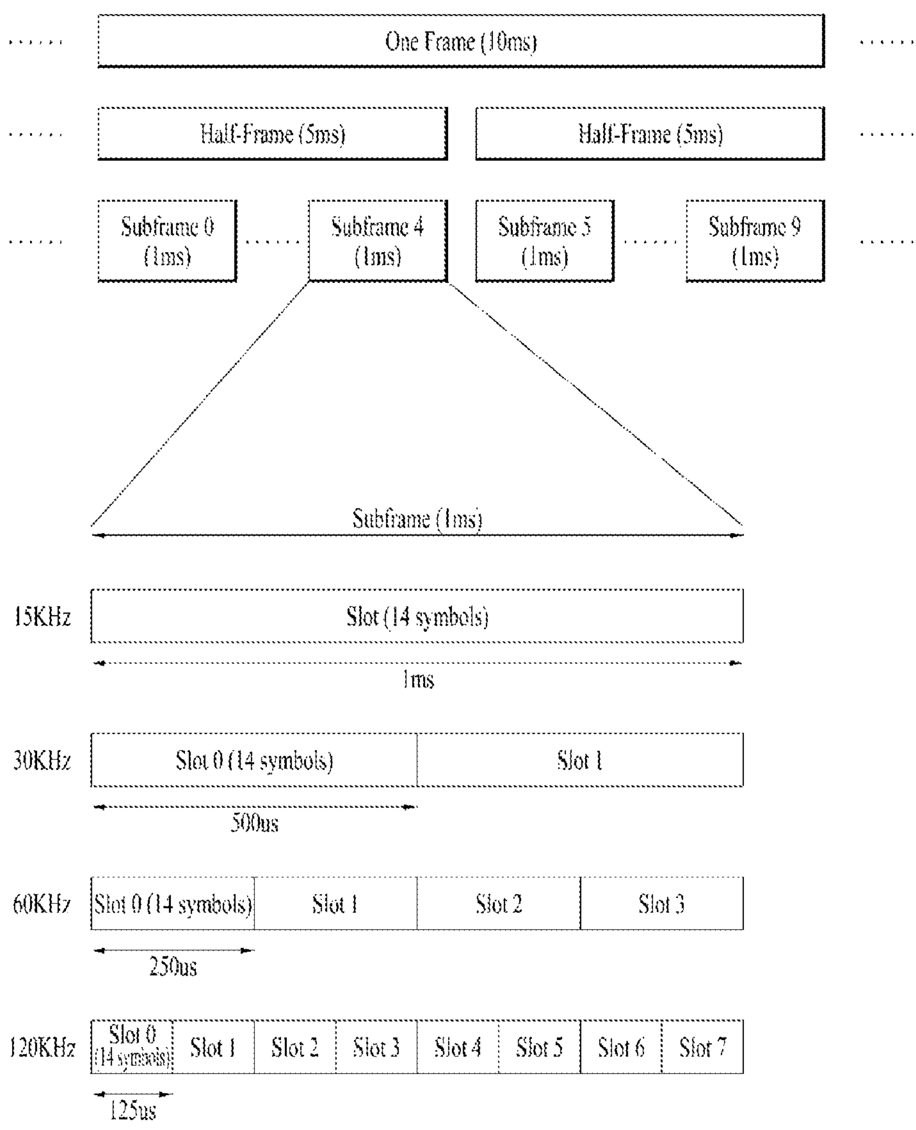
FIG. 1 illustrates a radio frame structure.

- 38.211: Physical channels and modulation
- 38.212: Multiplexing and channel coding
- 38.213: Physical layer procedures for control
- 38.214: Physical layer procedures for data
- 38.300: NR and NG-RAN Overall Description
- 38.331: Radio Resource Control (RRC) protocol specification FIG. 1 illustrates a radio frame structure used for NR.

In NR, UL and DL transmissions are configured in frames. Each radio frame has a length of 10 ms and is divided into two 5-ms half-frames. Each half-frame is divided into five 1-ms subframes. A subframe is divided into one or more slots, and the number of slots in a subframe depends on a subcarrier spacing (SCS). Each slot includes 12 or 14 OFDM(A) symbols according to a cyclic prefix (CP). When a normal CP is used, each slot includes 14 OFDM symbols. When an extended CP is used, each slot includes 12 OFDM symbols. A symbol may include an OFDM symbol (or a CP-OFDM symbol) and an SC-FDMA symbol (or a discrete Fourier transform-spread-OFDM (DFT-s-OFDM) symbol).

Table 1 exemplarily illustrates that the number of symbols per slot, the number of slots per frame, and the number of slots per subframe vary according to SCSs in a normal CP case.

TABLE 1

| SCS (15*2^u) | $N^{slot}_{symb}$ | $N^{frame,u}_{slot}$ | $N^{subframe,u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

* $N^{slot}_{symb}$: number of symbols in a slot
* $N^{frame,u}_{slot}$: number of slots in a frame
* $N^{subframe,u}_{slot}$: number of slots in a subframe Table 2 illustrates that the number of symbols per slot, the number of slots per frame, and the number of slots per subframe vary according to SCSs in an extended CP case.

TABLE 2

| SCS (15*2^u) | $N^{slot}_{symb}$ | $N^{frame,u}_{slot}$ | $N^{subframe,u}_{slot}$ |
|---|---|---|---|
| 60 KHz (u = 2) | 12 | 40 | 4 |

In the NR system, different OFDM(A) numerologies (e.g., SCSs, CP lengths, and so on) may be configured for a plurality of cells aggregated for one UE. Accordingly, the (absolute time) duration of a time resource (e.g., a subframe, a slot, or a transmission time interval (TTI)) (for convenience, referred to as a time unit (TU)) composed of the same number of symbols may be configured differently between the aggregated cells.

In NR, various numerologies (or SCSs) may be supported to support various 5th generation (5G) services. For example, with an SCS of 15 kHz, a wide area in traditional cellular bands may be supported, while with an SCS of 30 kHz or 60 kHz, a dense urban area, a lower latency, and a wide carrier bandwidth may be supported. With an SCS of 60 kHz or higher, a bandwidth larger than 24.25 kHz may be supported to overcome phase noise.

An NR frequency band may be defined by two types of frequency ranges, FR1 and FR2. FR1 and FR2 may be configured as described in Table 3 below. FR2 may be millimeter wave (mmW).

TABLE 3

| Frequency Range designation | Corresponding frequency range | Subcarrier Spacing |
|---|---|---|
| FR1 | 450 MHz-7125 MHz | 15, 30, 60 kHz |
| FR2 | 24250 MHz-52600 MHz | 60, 120, 240 kHz |

Figure 2:
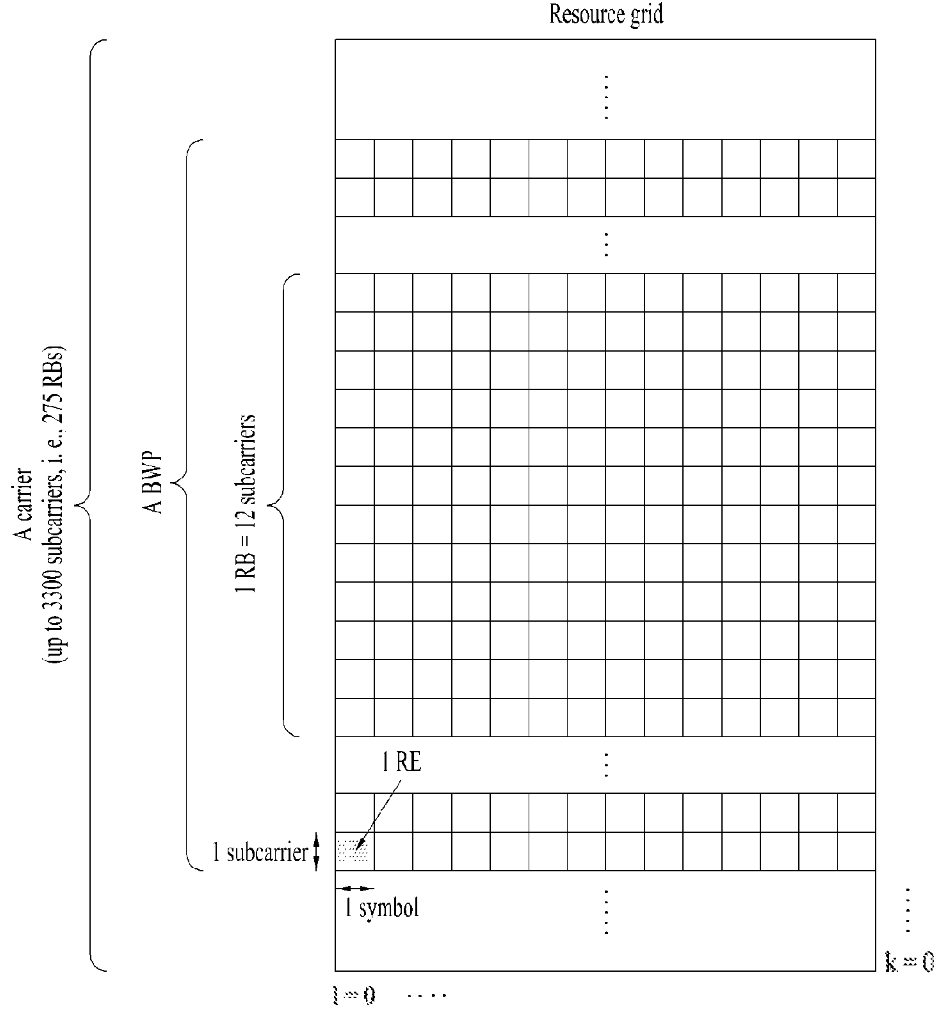
FIG. 2 illustrates a resource grid during the duration of a slot.

FIG. 2 illustrates a resource grid during the duration of one slot.

A slot includes a plurality of symbols in the time domain. For example, one slot includes 14 symbols in a normal CP case and 12 symbols in an extended CP case. A carrier includes a plurality of subcarriers in the frequency domain. A resource block (RB) may be defined by a plurality of (e.g., 12) consecutive subcarriers in the frequency domain. A plurality of RB interlaces (simply, interlaces) may be defined in the frequency domain. Interlace $m \in \{0, 1, \ldots, M-1\}$ may be composed of (common) RBs $\{m, M+m, 2M+m, 3M+m, \ldots\}$. M denotes the number of interlaces. A bandwidth part (BWP) may be defined by a plurality of consecutive (physical) RBs ((P)RBs) in the frequency domain and correspond to one numerology (e.g., SCS, CP length, and so on). A carrier may include up to N (e.g., 5) BWPs. Data communication may be conducted in an active BWP, and only one BWP may be activated for one UE. Each element in a resource grid may be referred to as a resource element (RE), to which one complex symbol may be mapped.

In a wireless communication system, a UE receives information from a BS in downlink (DL), and the UE transmits information to the BS in uplink (UL). The information exchanged between the BS and UE includes data and various control information, and various physical channels/signals are present depending on the type/usage of the information exchanged therebetween. A physical channel corresponds to a set of resource elements (REs) carrying information originating from higher layers. A physical signal corresponds to a set of REs used by physical layers but does not carry information originating from the higher layers. The higher layers include a medium access control (MAC) layer, a radio link control (RLC) layer, a packet data convergence protocol (PDCP) layer, a radio resource control (RRC) layer, and so on.

DL physical channels include a physical broadcast channel (PBCH), a physical downlink shared channel (PDSCH), and a physical downlink control channel (PDCCH). DL physical signals include a DL reference signal (RS), a primary synchronization signal (PSS), and a secondary synchronization signal (SSS). The DL RS includes a demodulation reference signal (DM-RS), a phase tracking reference signal (PT-RS), and a channel state information reference signal (CSI-RS). UL physical channel include a physical random access channel (PRACH), a physical uplink shared channel (PUSCH), and a physical uplink control channel (PUCCH). UL physical signals include a UL RS. The UL RS includes a DM-RS, a PT-RS, and a sounding reference signal (SRS).

Figure 3:
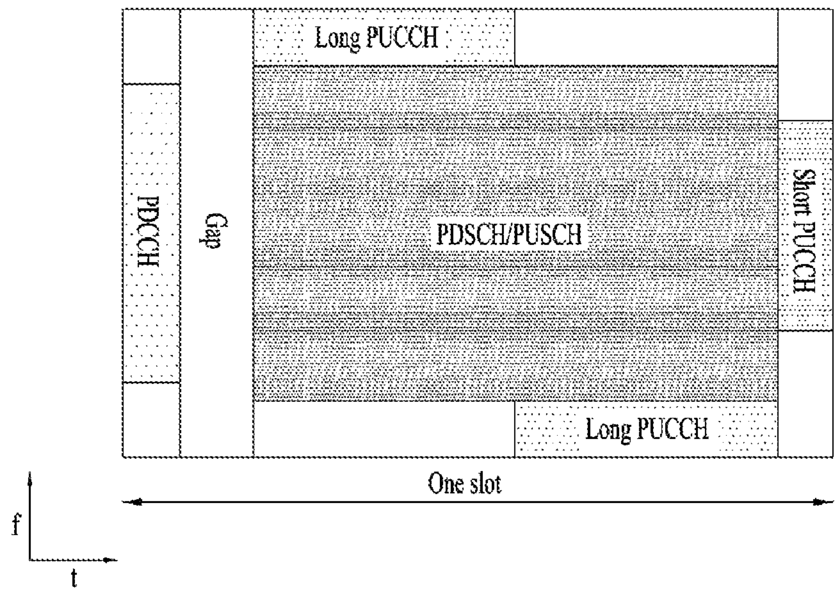
FIG. 3 illustrates an example of mapping physical channels within a slot.

FIG. 3 illustrates an example of mapping physical channels within a slot.

In the NR system, a frame has a self-contained structure in which a DL control channel, DL or UL data, a UL control channel, and the like may all be contained in one slot. For example, the first N symbols (hereinafter, DL control region) in the slot may be used to transmit a DL control channel, and the last M symbols (hereinafter, UL control region) in the slot may be used to transmit a UL control channel. N and M are integers greater than or equal to 0. A resource region (hereinafter, a data region) that is between the DL control region and the UL control region may be used for DL data transmission or UL data transmission. For example, the following configuration may be considered. Respective sections are listed in a temporal order.

In the present disclosure, a base station (BS) may be, for example, a gNode B (gNB).

UL Physical Channels/Signals (1) PUSCH

A PUSCH may carry UL data (e.g., uplink shared channel (UL-SCH) transport block (TB)) and/or uplink control information (UCI). The PUSCH may be transmitted based on a cyclic prefix orthogonal frequency division multiplexing (CP-OFDM) waveform or a discrete Fourier transform spread OFDM (DFT-s-OFDM) waveform. When the PUSCH is transmitted based on the DFT-s-OFDM waveform, the UE may transmit the PUSCH by applying transform precoding. For example, when the transform precoding is not allowed (e.g., when the transform precoding is disabled), the UE may transmit the PUSCH based on the CP-OFDM waveform. When the transform precoding is allowed (e.g., when the transform precoding is enabled), the UE may transmit the PUSCH based on the CP-OFDM waveform or DFT-s-OFDM waveform. PUSCH transmission may be dynamically scheduled by a PDCCH (dynamic scheduling) or semi-statically scheduled by higher layer signaling (e.g., RRC signaling) (and/or Layer 1 (L1) signaling (e.g., PDCCH)) (configured scheduling (CS)). Therefore, in the dynamic scheduling, the PUSCH transmission may be associated with the PDCCH, whereas in the CS, the PUSCH transmission may not be associated with the PDCCH. The CS may include PUSCH transmission based on a Type-1 configured grant (CG) and PUSCH transmission based on a Type-2 CG. For the Type-1 CG, all parameters for PUSCH transmission may be signaled by the higher layer. For the Type-2 CG, some parameters for PUSCH transmission may be signaled by higher layers, and the rest may be signaled by the PDCCH. Basically, in the CS, the PUSCH transmission may not be associated with the PDCCH.

(2) PUCCH

A PUCCH may carry UCI. The UCI includes the following information.

- Scheduling request (SR): The SR is information used to request a UL-SCH resource.
- Hybrid automatic repeat and request acknowledgement) (HARQ-ACK): The HARQ-ACK is a signal in response to reception of a DL signal (e.g., PDSCH, SPS release PDCCH, etc.). The HARQ-ACK response may include positive ACK (ACK), negative ACK (HACK), DTX (Discontinuous Transmission), or NACK/DTX. The HARQ-ACK may be interchangeably used with A/N, ACK/NACK, HARQ-ACK/NACK, and the like. The HARQ-ACK may be generated on a TB/CBG basis.
- Channel Status Information (CSI): The CSI is feedback information on a DL channel. The CSI includes a channel quality indicator (CQI), a rank indicator (RI), a precoding matrix indicator (PMI), a precoding type indicator (PTI), and so on.

Table 4 shows PUCCH formats. The PUCCH formats may be classified according to UCI payload sizes/transmission lengths (e.g., the number of symbols included in a PUCCH resource) and/or transmission structures. The PUCCH formats may be classified into short PUCCH formats (PUCCH formats 0 and 2) and long PUCCH formats (PUCCH formats 1, 3, and 4) according to the transmission lengths.

TABLE 4

| PUCCH format | Length in OFDM symbols $N_{symb}^{PUCCH}$ | Number of bits | Usage | Etc |
|---|---|---|---|---|
| 0 | 1-2 | ≤2 | HARQ, SR | Sequence selection |
| 1 | 4-14 | ≤2 | HARQ, [SR] | Sequence modulation |
| 2 | 1-2 | >2 | HARQ, CSI, [SR] | CP-OFDM |

TABLE 4-continued

| PUCCH format | Length in OFDM symbols $N_{symb}^{PUCCH}$ | Number of bits | Usage | Etc |
|---|---|---|---|---|
| 3 | 4-14 | >2 | HARQ, CSI, [SR] | DFT-s-OFDM (no UE multiplexing |
| 4 | 4-14 | >2 | HARQ, CSI, [SR] | DFT-s-OFDM (Pre DFT OCC) |

(0) PUCCH Format 0 (PF0)

Supportable UCI payload size: up to K bits (e.g., K=2)

Number of OFDM symbols included in one PUCCH: 1 to X symbols (e.g., X=2)

Transmission structure: only a UCI signal is configured with no DM-RS, and a UCI state is transmitted by selecting and transmitting one of a plurality of sequences.

(1) PUCCH Format 1 (PF1)

Supportable UCI payload size: up to K bits (e.g., K=2)

Number of OFDM symbols included in one PUCCH: Y to Z symbols (e.g., Y=4 and Z=14)

Transmission structure: UCI and a DM-RS are configured in different OFDM symbols based on time division multiplexing (TDM). For the UCI, a specific sequence is multiplied by a modulation symbol (e.g., QPSK symbol). A cyclic shift/orthogonal cover code (CS/OCC) is applied to both the UCI and DM-RS to support code division multiplexing (CDM) between multiple PUCCH resources (complying with PUCCH format 1) (in the same RB).

(2) PUCCH Format 2 (PF2)

Supportable UCI payload size: more than K bits (e.g., K=2)

Number of OFDM symbols included in one PUCCH: 1 to X symbols (e.g., X=2)

Transmission structure: UCI and a DMRS (DM-RS) are configured/mapped in/to the same symbol based on frequency division multiplexing (FDM), and encoded UCI bits are transmitted by applying only an inverse fast Fourier transform (IFFT) thereto with no DFT.

(3) PUCCH Format 3 (PF3)

Supportable UCI payload size: more than K bits (e.g., K=2)

Number of OFDM symbols included in one PUCCH: Y to Z symbols (e.g., Y=4 and Z=14)

Transmission structure: UCI and a DMRS are configured/mapped in/to different symbols based on TDM. Encoded UCI bits are transmitted by applying a DFT thereto. To support multiplexing between multiple UEs, an OCC is applied to the UCI, and a CS (or interleaved frequency division multiplexing (IFDM) mapping) is applied to the DM-RS before the DFT.

(4) PUCCH Format 4 (PF4 or F4)

Supportable UCI payload size: more than K bits (e.g., K=2)

Number of OFDM symbols included in one PUCCH: Y to Z symbols (e.g., Y=4 and Z=14)

Transmission structure: UCI and a DMRS are configured/mapped in/to different symbols based on TDM. The DFT is applied to encoded UCI bits with no multiplexing between UEs.

DL Physical Channel/Signal (1) PDSCH

A PDSCH carries DL data (e.g., DL-shared channel transport block (DL-SCH TB)). The TB is coded into a codeword (CW) and then transmitted after scrambling and modulation processes. The CW includes one or more code blocks (CBs). One or more CBs may be grouped into one code block group (CBG). Depending on the configuration of a cell, the PDSCH may carry up to two CWs. Scrambling and modulation may be performed for each CW, and modulation symbols generated from each CW may be mapped to one or more layers. Each layer may be mapped to resources together with a DMRS after precoding and transmitted on a corresponding antenna port. The PDSCH may be dynamically scheduled by a PDCCH (dynamic scheduling). Alternatively, the PDSCH may be semi-statically scheduled based on higher layer (e.g., RRC) signaling (and/or Layer 1 (L1) signaling (e.g., PDCCH)) (configured scheduling (CS)). Therefore, in the dynamic scheduling, PDSCH transmission is accompanied by the PDCCH, whereas in the CS, PDSCH transmission may not be accompanied by the PDCCH. The CS may include semi-persistent scheduling (SPS).

(2) PDCCH

A PDCCH carries Downlink Control Information (DCI). For example, the PDCCH (i.e., DCI) may carry: transmission formats and resource allocation of a DL-SCH; frequency/time resource allocation information on an uplink shared channel (UL-SCH); paging information on a paging channel (PCH); system information on a DL-SCH; time/frequency resource allocation information on a higher layer control message such as a random access response (RAR) transmitted over a PDSCH; transmit power control commands; and information on activation/deactivation of SPS/CS. Various DCI formats may be provided depending on information in DCI.

Table 5 shows DCI formats transmitted over the PDCCH.

TABLE 5

| DCI format | Usage |
|---|---|
| 0_0 | Scheduling of PUSCH in one cell |
| 0_1 | Scheduling of one or multiple PUSCH in one cell, or indicating downlink feedback information for configured grant PUSCH (CG-DFI) |
| 1_0 | Scheduling of PDSCH in one cell |
| 1_1 | Scheduling of PDSCH in one cell, and/or triggering one shot HARQ-ACK codebook feedback |
| 2_0 | Notifying a group of UEs of the slot format, available RB sets, COT duration and search space set group switching |
| 2_1 | Notifying a group of UEs of the PRB(s) and OFDM symbol(s) where UE may assume no transmission is intended for the UE |
| 2_2 | Transmission of TPC commands for PUCCH and PUSCH |
| 2_3 | Transmission of a group of TPC commands for SRS transmissions by one or more UEs |

DCI format 0_0 may be used to schedule a TB-based (or TB-level) PUSCH, and DCI format 0_1 may be used to schedule a TB-based (or TB-level) PUSCH or a CBG-based (or CBG-level) PUSCH. DCI format 1_0 may be used to schedule a TB-based (or TB-level) PDSCH, and DCI format 1_1 may be used to schedule a TB-based (or TB-level) PDSCH or a CBG-based (or CBG-level) PDSCH (DL grant DCI). DCI format 0_0/0_1 may be referred to as UL grant DCI or UL scheduling information, and DCI format 1_0/1_1 may be referred to as DL grant DCI or UL scheduling information. DCI format 2_0 may be used to provide dynamic slot format information (e.g., dynamic SFI) to the UE, and DCI format 2_1 may be used to provide downlink pre-emption information to the UE. UEs defined as one group may be provided with DCI format 2_0 and/or DCI format 2_1 over a group common PDCCH, which is a PDCCH defined for a group of UEs.

The PDCCH/DCI may include a cyclic redundancy check (CRC), and the CRC may be masked/scrambled with various identifiers (e.g., radio network temporary identifier (RNTI)) according to the owner or purpose of the PDCCH. For example, if the PDCCH is for a specific UE, the CRC may be masked with a cell-RNTI (C-RNTI). If the PDCCH relates to paging, the CRC may be masked with a paging-RNTI (P-RNTI). If the PDCCH relates to system information (e.g., system information block (SIB)), the CRC may be masked with a system information RNTI (SI-RNTI). If the PDCCH relates to a random access response, the CRC may be masked with a random access-RNTI (RA-RNTI).

Table 6 shows the usage of the PDCCH and transport channels according to the type of RNTI. Here, the transport channel means a transport channel related to data carried by a PDSCH/PUSCH scheduled by the PDCCH.

controlResourceSetId: this parameter/information indicates the identifier (ID) of the CORESET.

frequencyDomainResources: this parameter/information indicates frequency-domain resources of the CORESET. The frequency-domain resources may be indicated by a bitmap, and each bit corresponds to an RB group (=6 consecutive RBs). For example, the most significant bit (MSB) of the bitmap corresponds to the first RB group in the BWP. An RB group corresponding to a bit with a value of 1 may be allocated as a frequency-domain resource of the CORESET.

duration: this parameter/information indicates time-domain resources of the CORESET. The parameter/information duration may indicate the number of consecutive OFDMA symbols included in the CORESET. For example, duration has a value of 1-3.

cce-REG-MappingType: this parameter/information indicates a CCE-to-REG mapping type. An interleaved type and a non-interleaved type may be supported.

precoderGranularity: this parameter/information indicates a precoder granularity in the frequency domain.

TABLE 6

| RNTI | Usage | Transport Channel |
|---|---|---|
| P-RNTI | Paging and System Information change notification | PCH(Paging Channel) |
| SI-RNTI | Broadcast of System Information | DL-SCH |
| RA-RNTI | Random Access Response | DL-SCH |
| Temporary C-RNTI | Contention Resolution (when no valid C-RNTI is available) | DL-SCH |
| Temporary C-RNTI | Msg3 transmission | UL-SCH |
| C-RNTI, MCS(Modulation and Coding Scheme)-C-RNTI | Dynamically scheduled unicast transmission | UL-SCH |
| C-RNTI | Dynamically scheduled unicast transmission | DL-SCH |
| MCS-C-RNTI | Dynamically scheduled unicast transmission | DL-SCH |
| C-RNTI | Triggering of PDCCH ordered random access | N/A |
| CS(Configued Scheduling)-RNTI | Configured scheduled unicast transmission (activation, reactivation and retransmission) | DL-SCH, UL-SCH |
| CS-RNTI | Configured scheduled unicast transmission (deactivation) | N/A |
| TPC(Transmit Power Control)-PUCCH-RNTI | PUCCH power control | N/A |
| TPC-PUSCH-RNTI | PUSCH power control | N/A |
| TPC-SRS-RNTI | SRS trigger and power control | N/A |
| INT(Interruption)-RNTI | Indication pre-emption in DL | N/A |
| SFI(Slot Format Indication)-RNTI | Slot Format Indication on the given cell | N/A |
| SP(Semi-persistent)-CSI(Channel State Information)-RNTI | Activation of Semi-persistent CSI reporting on PUSCH | N/A |

For the PDCCH, a fixed modulation scheme may be used (e.g., quadrature phase shift keying (QPSK)). One PDCCH may include 1, 2, 4, 8, or 16 control channel elements (CCEs) depending on the aggregation level (AL). One CCE may include 6 resource element groups (REGs), and one REG may be defined by one OFDMA symbol and one (P)RB.

The PDCCH may be transmitted in a control resource set (CORESET). The CORESET corresponds to a set of physical resources/parameters used to carry the PDCCH/DCI within a BWP. For example, the CORESET may include a set of REGs with a given numerology (e.g., SCS, CP length, etc.). The CORESET may be configured by system information (e.g., MIB) or UE-specific higher layer (e.g., RRC) signaling. For example, the following parameters/information may be used to configure the CORESET. One UE may be configured with one or more CORESETs, and a plurality of CORESETs may overlap in the time/frequency domain.

tci-StatesPDCCH: this parameter/information indicates information (e.g., TCI-StateID) on a transmission configuration indication (TCI) state for the PDCCH. The TCI state may be used to provide a quasi-co-location (QCL) relationship between DL RS(s) in an RS set (TCI-state) and a PDCCH DMRS port.

tci-PresentInDCI: this parameter/information indicates whether a TCI field is included in DCI.

pdcch-DMRS-ScramblingID: this parameter/information indicates information used for initialization of a PDCCH DMRS scrambling sequence.

For PDCCH reception, the UE may monitor (e.g., blind decoding) a set of PDCCH candidates in the CORESET. The PDCCH candidate may mean CCE(s) monitored by the UE for PDCCH reception/detection. PDCCH monitoring may be performed in one or more CORESETs in an active DL BWP on each active cell in which the PDCCH monitoring is configured. The set of PDCCH candidates monitored by the UE may be defined as a PDCCH search space (SS) set. The SS set may be classified into a common search space (CSS) set or a UE-specific search space (USS) set.

Table 7 shows PDCCH search spaces.

TABLE 7

| Search Space | Type | RNTI | Use Case |
|---|---|---|---|
| Type0-PDCCH | Common | SI-RNTI on a primary cell | Broadcast of System Information |
| Type0A-PDCCH | Common | SI-RNTI on a primary cell | Broadcast of System Information |
| Type1-PDCCH | Common | RA-RNTI or TC-RNTI on a primary cell | Msg2, Msg4 in RACH |
| Type2-PDCCH | Common | P-RNTI on a primary cell | Paging<br>System Information change notification |
| Type3-PDCCH | Common | INT-RNTI, SFI-RNTI, TPC-PUSCH-RNTI, TPC-PUCCH-RNTI, TPC-SRS-RNTI, C-RNTI, MCS-C-RNTI or CS-RNTI | Group signaling |
| UE Specific | UE Specific | C-RNTI, MCS-C-RNTI or CS-RNTI | UE signaling (e.g., PDSCH/PUSCH) |

The SS set may be configured by system information (e.g., MIB) or UE-specific higher layer (e.g., RRC) signaling. S (e.g., 10) SS sets or less may be configured in each DL BWP of a serving cell. For example, the following parameters/information may be provided for each SS set. Each SS set may be associated with one CORESET, and each CORESET configuration may be associated with one or more SS sets.

searchSpaceId: this parameter/information indicates the ID of the SS set.

controlResourceSetId: this parameter/information indicates the CORESET associated with the SS set.

monitoringSlotPeriodicityAndOffset: this parameter/information indicates a PDCCH monitoring periodicity (in a unit of slot) and a PDCCH monitoring offset (in a unit of slot)

monitoringSymbolsWithinSlot: this parameter/information indicates first OFDMA symbol(s) for PDCCH monitoring in a slot in which the PDCCH monitoring is configured. The first OFDMA symbol(s) are indicated by a bitmap, and each bit corresponds to each OFDMA symbol in the slot. The MSB of the bitmap corresponds to the first OFDM symbol in the slot. OFDMA symbol (s) corresponding to bit(s) with a value of 1 corresponds to the first symbol(s) in the CORESET in the slot.

nrofCandidates: this parameter/information indicates the number of PDCCH candidates (e.g., one of 0, 1, 2, 3, 4, 5, 6, and 8) for each AL (where AL={1, 2, 4, 8, 16}).

searchSpaceType: this parameter/information indicates whether the SS type is the CSS or USS.

DCI format: this parameter/information indicates the DCI format of a PDCCH candidate.

The UE may monitor PDCCH candidates in one or more SS sets in a slot according to the configuration of the CORESET/SS set. An occasion (e.g., time/frequency resource) to monitor PDCCH candidates is defined as a PDCCH (monitoring) occasion. One or more PDCCH (monitoring) occasions may be configured within a slot.

1. Signal Transmission and Reception in High Frequency Bands

The above contents are applicable in combination with methods proposed in the present disclosure, which will be described later. Alternatively, the contents may clarify the technical features of the methods proposed in the present disclosure.

In addition, the following methods may be equally applied to the above-described NR system or shared spectrum (licensed bands). Thus, it is obvious that the terms, expressions, and structures in this document may be modified to be suitable for the system in order to implement the technical idea of the present disclosure in the corresponding system.

The NR system supports various numerologies (or SCSs) to provide various 5G services. For example, the NR system may support a wide area in conventional cellular bands with an SCS of 15 kHz and support a dense urban area and a wide carrier bandwidth with lower latency with an SCS of 30/60 kHz. For an SCS above 60 kHz, NR may support a bandwidth of 24.25 GHz or higher. According to Release 16, NR frequency bands are divided into two frequency ranges (FR1 and FR2), which may be configured as shown in Table 3. In addition, discussions are ongoing to support future NR systems operating above frequency bands defined in FR1/FR2 (for example, 52.6 GHz to 71 GHz).

Frequency bands above FR1 and FR2 (e.g., bands from 52.6 GHz to 114.25 GHz, and more particularly, bands from 52.6 GHz to 71 GHz) may be referred to as FR2-2. The waveforms, SCSs, CP lengths, timings, etc. defined for FR1 and FR2 in the current NR system may not be applied to FR2-2.

For NR operation in bands above 52.6 GHz, SCSs of 120 kHz, 480 kHz, and 960 kHz are used. In addition, multiple slots, PDSCHs, and PUSCHs may be scheduled through a single DCI. When multiple PDSCHs or PUSCHs are received and/or transmitted across multiple slots, changes in the demodulation reference signal (DMRS) symbol may occur. For DMRS configured on a single PDSCH (or PUSCH), the position of the DMRS symbol is configured as either a single symbol or a double symbol in the front-loaded position. When multiple PDSCHs (or PUSCHs) are transmitted in succession, the DMRS symbol may be unused for some PDSCHs (or PUSCHs) to reduce the ratio of DMRS signals to data. PDSCHs that do not include the DMRS symbol may be referred to as "DMRS-less PDSCHs", PUSCHs that do not include the DMRS symbol may be referred to as "DMRS-less PUSCHs", and slots that do not include the DMRS symbol may be referred to as "DMRS-less slots". When DMRS-less PDSCH/PUSCH is used in multi-PDSCH/PUSCH scheduling, it is necessary to determine how to determine the transport block size (TBS) for the PDSCH/PUSCH and how to operate when the PUSCH overlaps with the PUCH to ensure stable signal transmission and reception.

For NR operation in high frequency (e.g., above 52.6 GHz)/wideband, the present disclosure provides a method for operating a UE and a basis station in relation to the DMRS-less slots, DMRS-less PDSCH, and/or DMRS-less PUSCH at a newly introduced SCS (e.g., 480, 960 kHz) in the newly introduced multi-slot scheduling, multi-PDSCH scheduling, and/or multi-PUSCH scheduling, and a configuration method therefor. Multi-slot scheduling, multi-PDSCH scheduling, and/or multi-PUSCH scheduling refers to the operation of scheduling multiple slots, multiple PDSCHs, and/or multiple PUSCHs with one DCI.

In the specific proposed methods described below, "slot, PDSCH, and/or PUSCH" may be represented by X for simplicity. For example, multi-slot scheduling, multi-PDSCH scheduling, and/or multi-PUSCH scheduling may be represented by "multi-X scheduling". "DMRS-less slot, DMRS-less PDSCH, and/or DMRS-less PUSCH" may be represented by "DMRS-less X". Also, "PDSCH and/or PUSCH" may be represented by "PxSCH" or "PDSCH/PUSCH". "Slot and/or PxSCH" may be represented by "Slot/PxSCH".

Multi-X scheduling to which the specific proposed method for DMRS-less X described later may be applied includes the following scenarios.

(1) A Case Where Individual TBs are Each Transmitted in Multiple Slots/PxSCHs

Each slot/PxSCH may be assigned an individual TB, and the TBS may vary among slots/PxSCHs.

(2) A Case Where One TB is Repeatedly Transmitted in Multiple Slots/PxSCHs (TB Repetition)

A TB is repeated in every multiple slots/PxSCHs, and the TBS is the same in all multiple slots/PxSCHs.

(3) A case where individual TBs are transmitted in some slots/PxSCHs, respectively and a single TB is transmitted repeatedly in some slots/PxSCHs.

A mixed case of (1) and (2), where the TB allocation and TBS determination are the same as in (1) and (2) for slots/PxSCHs that are transmitted individually or repeatedly. For example, a TB may be repeatedly transmitted only in R consecutive slots among M slots, while each TB may be transmitted individually in other slots.

In scenarios (1) to (3) above, the multiple slots/PxSCHs may all be consecutive. Alternatively, some slot(s) of the multiple slots/PxSCHs may be non-consecutive.

In scenarios (1) to (3) above, when the number of multiple slots/PxSCHs constituting the multi-X scheduling is denoted by M, the slots/PxSCHs may be indexed as index 0, index 1, . . . , index M−1, starting from the earliest X. In the time domain. M=1 may also be possible.

1.1. Method of Indicating the Position (Index) of DMRS-Less X

When multi-X scheduling involves a DMRS-less X, a method of indicating the position (or index) of the DMRS-less X is needed. As described later, the position of the DMRS-less X may be pre-defined. The position of the DMRS-less X may also be semi-statically configured and/or indicated through higher-layer signaling such as RRC or MAC CE. The position of the DMRS-less X may be dynamically configured and/or indicated through DCI, etc.

1.1-1. Dynamic (Explicit) Indication

An index of DMRS-less X may be configured and/or indicated by DCI. In this case, the DCI may contain the value of the index. For example, when it is assumed that 8 PDSCHs are scheduled through one DCI and the third PDSCH (the PDSCH with index 2) is DMRS-less, the position of the DMRS-less PDSCH may be indicated by '2' through the DCI. The DCI may also contain a bitmap to indicate the indices of the DMRS-less X. For example, when it is assumed that 8 PDSCHs are scheduled through one DCI and the third PDSCH (the PDSCH with index 2) is DMRS-less, the position of the DMRS-less PDSCH may be indicated by an 8-bit bitmap in the form of '0010_0000' in the DCI.

1.1-2. Semi-Static (Implicit) Indication 1.1-2-1. Fixing the number and positions of DMRS-less X to be used according to the number of slots/PxSCHs used for multi-X scheduling. Once M is determined, the number and positions of DMRS-less Xs are automatically determined. For example, when 8 slots/PxSCHs are scheduled, a rule may be predetermined that the slots/PxSCHs with index 2 and index 7 shall be configured as DMRS-less Xs.

1.1-2-2. Configuring DMRS-less X to be used every specific number of slots/PxSCHs. DMRS-less X may be configured for every kth slot/PxSCH, regardless of M. In Example 1, where 16 slots are multi-slot scheduled, and any slot with a slot index that is a multiple of 3 may be configured as a DMRS-less slot. In Example 2, where 8 PxSCHs are multi-PxSCH scheduled, the even numbered PxSCHs may be configured as DMRS-less PxSCHs. In Example 3, where 10 slots are multi-slot scheduled, all PxSCHs included in slots with slot indices that are multiples of 4 may be configured as DMRS-less PxSCHs.

1.1-2-3. If only some of the M Xs are subjected to TB repetition, the configuration method in 1.1-2-1 and/or 1.1-2-2 above may be used only in the corresponding intervals. Also, if only some of the M Xs are subjected to TB repetition, the configuration method in 1.1-2-1 and/or 1.1-2-2 may be used for all M Xs.

1.1-2-4. The following may be constrained. "In a situation where a different beam is indicated for each X included in multi-X scheduling, the first X after the beam change shall not be a DMRS-less X." For example, in multi-PDSCH scheduling, when the beams are indicated to change starting on the fourth PDSCH, the fourth PDSCH must contain a DMRS symbol.

1.2. TBS Configuration Method for DMRS-Less PxSCH

The UE shall determine the transport block size (TBS) for the allocated (or scheduled) PDSCH or PUSCH (see 3GPP TS 38.214 for details on how to determine the TBS). The TBS may be determined by first determining the NRE (number of REs carrying data in the allocated PxSCH, denoted as N_RE) and $N_{info}$ (number of unquantized information bits that may be allocated to the allocated PxSCH, denoted as N_info), and then using a TBS table and/or formula based on the size of N_info. The following are the formulas for calculating N_RE and N_info as described in 3GPP TS 38.214.

$$\text{N\_RE} = \min(156, \text{N}'\text{\_RE}) \cdot \text{n\_PRB}$$

$$\text{N}'\text{\_RE} = \text{N\^{}RB\_sc} \cdot N\text{\^{}sh\_symb} - \text{N\^{}PRB\_DMRS} - \text{N\^{}PRB\_oh}$$

$$\text{N\_info} = \text{N\_RE} \cdot R \cdot \text{Q\_m} \cdot v$$

In the above formulas, '^' means that subsequent characters are superscripts and '_' means that subsequent characters are subscripts. For example, $$N_{sc}^{RB}$$

is represented as N^RB_sc.

n_PRB denotes the total number of allocated PRBs for the UE). n^RB_sc denotes the number of subcarriers per resource block (RB). N^sh_symb denotes the number of symbols of the PxSCH allocation within the slot. N^PRB_DMRS denotes the number of REs for DM-RS per PRB in the scheduled duration including the overhead of the DM-RS CDM groups without data. N^PRB_oh denotes the overhead configured by a higher layer parameter. The higher layer parameter may be, for example, the xOverhead and/or xOverhead-Multicast. R is the target code rate, and Q_m is the modulation order. ν is the Greek letter nu, denoting the number of layers of the PxSCH, hereafter denoted by a capitalized V.

In the present disclosure, a method of setting and/or indicating the value of V used to determine TBS and a method of determining N_RE (the number of REs to which data may be mapped for an allocated RB) will be described separately.

1.2-1. Setting/Indicating V

In the methods described below, V0, Vc, and V1 may be predefined, set semi-statically set through RRC or the like, or set and/or indicated dynamically through DCI or the like.

1.2-1-1. A separate field to indicate V used for DMRS-less X may be newly defined in the DCI format. In addition, the 'antenna port' field used in DCI format 1_1 and so on may be reused to indicate V used for DMRS-less X.

1.2-1-2. In multi-X scheduling, once the default V (V0) and common V (Vc) for M Xs are set, V0 or Vc may be set for DMRS-less X, and V may be set for non-DMRS-less Xs using the 'antenna port' field in the DCI.

1.2-1-3. When multi-X scheduling that includes DMRS-less Xs is configured, a specific V (V1) may be set to be used on all Xs. For example, when multi-PxSCH scheduling including DMRS-less PxSCH is configured, only rank-1 transmissions may be allowed (i.e., V1=1).

1.2-1-4. If TB repetition is configured in k Xs among M Xs in multi-X scheduling, the value of V may be determined to be one for the Xs corresponding to the TB repetition. If a DMRS-less X is present in the duration of TB repetition, the one determined V may be used as V for the DMRS-less X. For example, for multi-PxSCH scheduling with M (=8) PxSCHs, if TB repetition is configured for the PxSCHs with index 4 and index 5, and the PxSCH with index 5 is a DMRS-less PxSCH, the value of V for the PxSCH with index 4 may be used for the PxSCH with index 5.

1.2-2. Determining N_RE

The determination of N_RE relates to how to determine the number of data REs among the RBs allocated for DMRS-less Xs in multi-X scheduling. Methods of determining N_RE are proposed for the case where individual TBs are allocated for Xs by multi-X scheduling, and for the case where a TB is repeatedly configured for Xs.

1.2-2-1. When Individual TBs are Allocated for Xs 1.2-2-1-1. The TBS is determined using the N_RE for each of the Xs. For a DMRS-less X, N_RE is determined based on the number of data REs of the X.

1.2-2-1-2. For M Xs allocated for multi-X scheduling, the TBS may be determined based on the same N_RE. The same number N_RE (Nc) is used for both the X containing DMRS and DMRS-less X. Specifically, Nc may be determined by one or more of the following three methods.

1.2-2-1-2-i. Nc is determined based on the number of data REs in the DMRS-containing X.

1.2-2-1-2-ii. Nc is determined based on the number of data REs in the DMRS-less X.

1.2-2-1-2-iii. If the number of DMRS-less Xs included in multi-X scheduling is less than a specific number (T), the method in 1.2-2-1-2-i is applied. If the number is greater than the specific number (T), the method in 1.2-2-1-2-ii is applied to determine Nc. T may be set semi-statically by higher layer signaling, such as RRC, or dynamically by DCI.

In each of the above three methods, if there are multiple Xs, Nc may be determined based on the multiple Xs. Alternatively, Nc may be determined using the average, maximum, and/or minimum of the number of data REs for each of the multiple Xs as a representative value.

1.2-2-2. For TB Repetitions

The same TBS is used for all M Xs allocated for multi-X scheduling. N_RE may be determined using one of the following four methods.

1.2-2-2-1. N_RE is determined based on the number of data REs of X containing DMRS.

1.2-2-2-2. N_RE is determined based on the number of data REs of DMRS-less X.

1.2-2-2-3. If the number of DMRS-less Xs included in multi-X scheduling is less than a specific number (T), the method in 1.2-2-2-1 is applied. If the number is greater than the specific number (T), the method in 1.2-2-2-2 is applied to determine N_RE. T may be set semi-statically by higher layer signaling such as RRC or dynamically by DCI.

1.2-2-2-4. N_RE may be determined based on the number of data REs of the first k Xs (where k is an integer from 1 to M) among the Xs included in multi-X scheduling consisting of M Xs. In this case, the first k Xs may be limited to Xs containing DMRS. The first k Xs may be used to determine the N_RE regardless of whether they contain DMRS. Further, in determining the number of data REs allocated to the k Xs when k>1, the number of data REs may be determined based on the average, maximum, and/or minimum of the number of data REs allocated to each of the Xs as a representative value.

1.2-2-3. In determining the TBS for the DMRS-less X, including the N_RE determination methods described above, the following three methods may be applied in common.

1.2-2-3-1. For DMRS-less PxSCH, N_RE may be determined as N_RE=min(168, N'_RE)·n_PRB. For PxSCH containing DMRS, N_RE may be determined as N_RE=min (156, N'_RE)·n_PRB.

For the DMRS-less PxSCH, N^PRB_DMRS=0.

1.2-2-3-3. N^PRB_oh for DMRS-less X included in multi-X scheduling may be set separately. N^PRB_oh of the DMRS-containing X is set through RRC signaling and is applied to DMRS-containing Xs in common. The separately set N^PRB_oh may be dynamically configured and/or indicated to the UE using a separate field in the DCI. Alternatively, the separately set N^PRB_oh may be applied only to the DMRS-less Xs without separate indication. Additionally, the separately set N^PRB_oh for DMRS-less Xs may be set by an offset value (e.g., an increase or decrease) from N^PRB_oh set for DMRS-containing Xs.

1.3. Case Where a PUCCH Overlaps With a DMRS-Less PUSCH, or UCI is Mapped to or Piggybacked on a DMRS-Less PUSCH PUCCH may overlap with PUSCH slots or symbols allocated in multi-slot PUSCH scheduling or multi-PUSCH scheduling. Depending on the UCI type of the existing PUCCH, the UCI may be multiplexed to the PUSCH, or the overlapping PUSCH may be dropped. If the PUSCH overlapping with the PUCCH is a DMRS-less PUSCH that is included in multi-slot/PUSCH scheduling, the method of performing UCI multiplexing may change from the existing method. The method described below relates to the criteria for dropping PUSCH and change of the method for UCI multiplexing.

1.3-1. Multiplexing UCI on DMRS-Less PUSCH

In conventional communication systems, when UCI is multiplexed on PUSCH, the UE punctures or rate-matches the HARQ-ACK starting from the symbol position with index s+1 with respect to the last symbol (with index s) among the front-loaded DMRS symbols, and then maps the CSI reporting according to the established rules. When HARQ-ACK or CSI is multiplexed on DMRS-less PUSCH, there is no front-loaded DMRS symbol to reference for HARQ-ACK mapping, and therefore a reference symbol (ref-symbol) to serve as a reference for HARQ-ACK puncturing or rate-matching may be determined using one of the two methods below. For DMRS-less PUSCH, reserved REs may be allocated for the puncturing of HARQ-ACK starting with the symbol immediately following the ref-symbol, and HARQ-ACKs may be mapped to REs for rate matching. After the RE positions for HARQ-ACK are determined, CSI and PUSCH data are mapped sequentially using conventional methods.

1.3-1-1. The reference symbol may be determined as the symbol immediately preceding the first symbol allocated as DMRS-less PUSCH resource: In the case where the first symbol of DMRS-less PUSCH is symbol m in slot n (where m is the symbol index), if m=0, the reference symbol is determined as the symbol with index 13 in slot n−1 (i.e., the last symbol in slot n−1). If m>0, the reference symbol is determined as the symbol with index m−1 in slot n. In other words, this method maps the first UCI that is mapped to the DMRS-less PUSCH, starting with the first symbol for the PUSCH. The first mapped UCI may be HARQ-ACK if HARQ-ACK is present. It may be CSI part1 if HARQ-ACK is not present and CSI is present.

1.3-1-2. For a PUSCH that includes DMRS among the PUSCHs configured through one multi-PUSCH scheduling, when the index of the last symbol of the front-loaded DMRS symbol is z, the symbol with index z among the symbols of the DMRS-less PUSCH is determined as the reference symbol: For example, when the n-th PUSCH among the multi-PUSCH scheduled PUSCHs includes DMRS and the front-loaded DMRS is positioned at symbol index 2 as a single symbol, and the n+1th PUSCH is a DMRS-less PUSCH, the symbol with index 2 for the DMRS-less PUSCH may be determined as the reference symbol.

The index of the reference symbol determined by either one of the above two methods plus 1 is used instead of 1_0 in the following equation (see 3GPP TS 38.212) to obtain the number of coded modulation symbols per layer (Q'_ACK) for HARQ-ACK, and may be used to obtain the number of coded modulation symbols per layer for HARQ-ACK when HARQ-ACK is carried on a DMRS-less PUSCH.

$$Q'_{ACK} = \min\left\{\left\lceil \frac{(O_{ACK} + L_{ACK}) \cdot \beta_{offset}^{PUSCH} \cdot \sum_{l=0}^{N_{symb,all}^{PUSCH}-1} M_{sc}^{UCI}(l)}{\sum_{r=0}^{C_{UL-SCH}-1} K_r} \right\rceil, \left\lceil \alpha \cdot \sum_{l=l_0}^{N_{symb,all}^{PUSCH}-1} M_{sc}^{UCI}(l) \right\rceil \right\} \quad \text{(i)}$$

-continued $$Q'_{ACK} = \min\left\{\left\lceil \frac{(O_{ACK} + L_{ACK}) \cdot \beta_{offset}^{PUSCH}}{R \cdot Q_m} \right\rceil, \left\lceil \alpha \cdot \sum_{l=l_0}^{N_{symb,all}^{PUSCH}-1} M_{sc}^{UCI}(l) \right\rceil \right\} \quad \text{(ii)}$$

Equation (i) is used when the HARQ-ACK is carried on the PUSCH together with UL-SCH data, and equation (ii) is used when the HARQ-ACK is carried on the PUSCH without UL-SCH data.

1.3-2 Selectively Dropping PUSCH Overlapping With PUCCH Depending on UCI Type

If a DMRS-less PUSCH overlaps with a PUCCH, one of the following two operations may be performed.

1.3-2-1. The UE shall drop the overlapping DMRS-less PUSCH regardless of the UCI type.

1.3-2-2. The UE shall drop the DMRS-less PUSCH if it overlaps with a PUCCH containing HARQ-ACK and multiplex the UCI on the DMRS-less PUSCH if the DMRS-less PUSCH overlaps with a PUCCH containing CSI only. The multiplexing may be perform according to the method in 1.3-1.

1.3-3 When Aperiodic CSI (a-CSI) Reporting Overlaps With a DMRS-Less PUSCH

In conventional communication systems, when the a-CSI trigger state is triggered by a UL grant, the UE shall transmit the a-CSI report using the PUSCH. If two PUSCHs are scheduled with DCI format 0_1, the UE shall transmit the a-CSI on the second PUSCH. If three or more PUSCHs are scheduled with DCI format 0_1, the UE shall transmit the a-CSI on the penultimate PUSCH. If the multi-PUSCH scheduling includes a DMRS-less PUSCH, the corresponding operation (i.e., the a-CSI trigger state is triggered by a UL grant and the a-CSI is transmitted on the PUSCH) may change as follows.

1.3-3-1. When two PUSCHs are scheduled by DCI for scheduling multiple PUSCHs, the operation shall be performed as follows. If the first PUSCH is a PUSCH containing DMRS and the second PUSCH is a DMRS-less PUSCH, the a-CSI report shall be included in the first PUSCH. If both PUSCHs are DMRS-containing PUSCHs, the a-CSI report shall be included in the second PUSCH.

1.3-3-2. If three or more PUSCHs are scheduled by DCI for scheduling multiple PUSCHs, the operation shall be performed as follows. The a-CSI report shall be included in the penultimate PUSCH. If the penultimate PUSCH is a DMRS-less PUSCH, the a-CSI report shall be included in the last PUSCH among the PUSCHs containing DMRS. The last PUSCH among the PUSCHs containing DMRS may be a PUSCH with a lower index than the DMRS-less PUSCH, or may be a PUSCH with a higher index than the DMRS-less PUSCH (i.e., it may be the last PUSCH).

1.3-3-3. When two PUSCHs are scheduled and the second PUSCH that should contain a-CSI report is a DMRS-less PUSCH, or when three or more PUSCHs are scheduled and the penultimate PUSCH that should contain a-CSI report is a DMRS-less PUSCH, the UE may forcibly transmit the DMRS symbol on the DMRS-less PUSCH. In other words, even if a DMRS-less PUSCH is scheduled by the BS, the UE shall transmit the PUSCH with DMRS included. For DMRS configuration, the configuration of the co-scheduled DMRS-containing PUSCH shall be used.

1.4. Configuring PTRS on DMRS-Less PxSCH

If a phase tracking reference signal (PTRS) is used on a PDSCH or PUSCH, the port (antenna port) of each PTRS is associated with one of the DMRS ports used on the same PxSCH to determine the port number (index). If a PTRS is used on a DMRS-less PxSCH when multiple PxSCHs contain the DMRS-less PxSCH, the PTRS port cannot be defined using the conventional method of associating a PTRS port with a DMRS port because no DMRS port is defined for the PxSCH. In this case, the PTRS port may be determined on the DMRS-less PxSCH using the method described in 1.4-1 below.

1.4-1. When PTRS is configured to be used on PxSCHs allocated by multi-PxSCH scheduling, and the allocated PxSCHs include a DMRS-less PxSCH, the PTRS port of the DMRS-less PxSCH is determined to be the same as the PTRS port of the immediately preceding PxSCH.

The time-domain density at the symbol level of the PTRS on the PDSCH and/or PUSCH is set using L_PT-RS (hereafter denoted L). If L=1, the PTRS is used at 1-symbol intervals. If L=2, the PTRS is used at 2-symbol intervals. If L=4, the PTRS is used at 4-symbol intervals. In this case, the first PTRS symbol of each PxSCH is determined L symbols after the DMRS symbol. For example, when L=2, if the front-loaded DMRS symbol (a single symbol) is positioned at the symbol with index 2, the first PTRS may be positioned at the symbol with index 4, and PTRSs may be positioned at the symbols with indexes 6, 8, 10, and 12 (provided that there are no additional DMRSs in the slot other than the DMRS positioned at the symbol with index 2). On the other hand, if the PTRS is used for symbols without DMRS, a method of determining the position of the PTRS symbol (symbol index) is needed, and the two methods described in 1.4-2 below may be used.

1.4-2. Method of Determining the Position of PTRS Symbol on DMRS-Less PxSCH 1.4-2-1. Determine the first symbol (index 0) of the DMRS-less PxSCH as the first PTRS symbol, and configure PTRSs consecutively at intervals of L symbols.

1.4-2-2. Configure PTRSs of the DMRS-less PxSCH (consecutively) at intervals of L symbols from the last PTRS symbol of the immediately preceding PxSCH of the DMRS-less PxSCH.

The contents of the present disclosure are not limitedly applied only to UL and/or DL signal transmission and reception. For example, the contents of the present disclosure may also be used for direct communication between UEs. In this document, the term based station (BS) may be understood as a concept including a relay node as well as a BS. For example, the operations of a BS described in the present disclosure may be performed by a relay node as well as the BS.

It is obvious that each of the examples of the proposed methods may also be included as one implementation method of the present disclosure, and thus each example may be regarded as a kind of proposed method. Although the above-described proposed methods may be implemented independently, some of the proposed methods may be combined and implemented. In addition, it may be regulated that information on whether the proposed methods are applied (or information on rules related to the proposed methods) is transmitted from the BS to the UE in a predefined signal (e.g., physical layer signaling or higher layer signaling).

IMPLEMENTATION EXAMPLES

Figure 4:
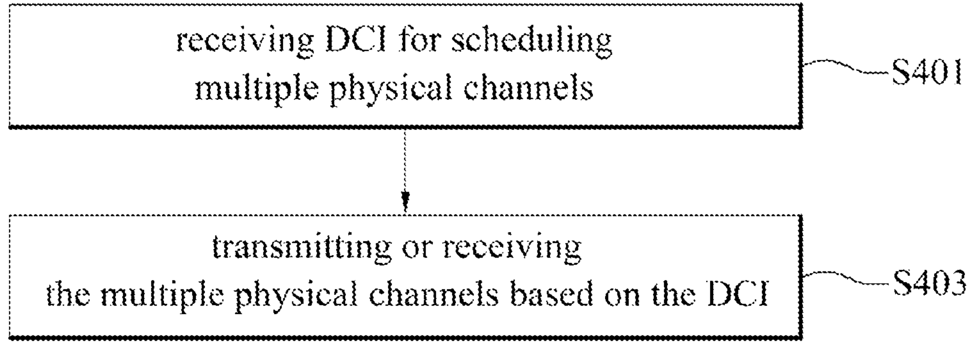
FIGS. 4 and 5 illustrate a signal transmission/reception method according to embodiments of the present disclosure.
Figure 5:
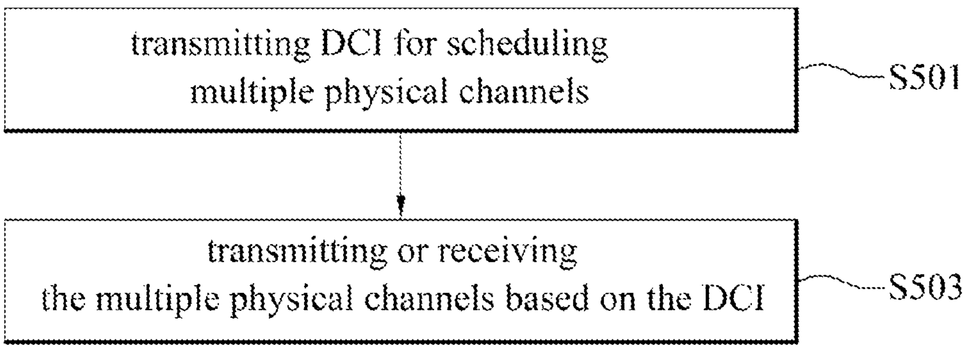

FIGS. 4 and 5 illustrate a signal transmission/reception method according to embodiments of the present disclosure.

Referring to FIG. 4, an embodiment performed by a UE may include receiving DCI for scheduling multiple physical channels (S401), and transmitting or receiving multiple physical channels based on the DCI (S403).

Referring to FIG. 5, an embodiment performed by a BS may include transmitting DCI for scheduling multiple physical channels (S501), and transmitting or receiving multiple physical channels based on the DCI (S503).

In addition to the operations of FIG. 4 and/or FIG. 5, one or more of the operations described in section 1 may be further performed.

For example, the multiple physical channels may include a slot, a PDSCH, and/or a PUSCH.

Further, at least one of the multiple physical channels may be a DMRS-less physical channel. The DMRS-less physical channel may refer to a physical channel that does not include DMRS on a resource allocated for the physical channel. The DMRS-free physical channel may be referred to as a first physical channel. The resource on which the first physical channel is transmitted or received may be referred to as a first resource.

In contrast to the DMRS-less physical channel, a physical channel that is transmitted along with DMRS within a resource allocated for the physical channel may be referred to as a second physical channel. The resource on which the second physical channel is transmitted or received may be referred to as a second resource.

The position of the first physical channel among the multiple physical channels may be determined using a combination of one or more of the methods disclosed in section 1.1. For example, the position of the first physical channel may be configured through the DCI according to section 1.1-1. Additionally, it may be semi-statically configured according to section 1.1-2.

The TBS of the first physical channel may be determined by a combination of one or more of the methods disclosed in section 1.2.

For example, when the TBS of the first physical channel is a first TBS, the first TBS may be determined based on V and N_REs described in section 1.2. When the number of REs containing data within the first physical channel is N_RE1 and the number of layers in the first physical channel is V1, the first TBS is determined based on N_RE1 and V1. When the number of REs containing data within the second physical channel is N_RE2 and the number of layers in the second physical channel is V2, the second TBS is determined based on N_RE2 and V2.

V1 may be determined by a combination of one or more of the methods discussed in section 1.2-1.

For example, according to section 1.2-1-1, V1 may be indicated by a field contained in the DCI. The field indicating V1 may be a conventional field for indicating an antenna port for a physical channel containing DMRS.

According to section 1.2-1-2, a default V (V0) and a common V (Vc) are configured for multiple physical channels indicated by the DCI. For the first physical channel, V0 or Vc is used (V1 is V0 or Vc). For the second physical channel, the value of V indicated by the antenna port field contained in the DCI is used (V2 is set by the antenna port field in the DCI).

According to section 1.2-1-3, if the multiple physical channels include the first physical channel, a specific value of V may be set for all the multiple physical channels. Thus, V1 and V2 are set identically.

According to section 1.2-1-4, when the first and second physical channels are transmitted through TB repetition, V1 and V2 may be set identically. On the contrary, when the TB of the first physical channel and the TB of the second physical channel are different, V1 and V2 are set independently of each other.

N_RE1 may be determined by a combination of one or more of the methods disclosed in section 1.2-2.

For example, referring to sections 1.2-2-1 and 1-2-2-2 in common, N_RE1 and N_RE2 may be determined based on common N_RE (Nc) for the multiple physical channels. Nc may be determined based on N_RE1 or may be determined based on N_RE2. When the number of first physical channels among the multiple physical channels is less than a threshold T, Nc may be determined based on N_RE2. When the number of first physical channels is greater than or equal to the threshold T, Nc may be determined based on N_RE1. If there are multiple first physical channels, one or more of the average, maximum, and minimum of N_RE1 may be used. When there are multiple second physical channels, one or more of the average, maximum, and minimum of N_RE2 may be used.

According to section 1.2-2-2-4, when multiple physical channels are transmitted through TB repetition, only some physical channels among the multiple physical channels may be used to determine Nc. Some physical channels may be the k preceding physical channels in the time domain. Further, some physical channels may be k physical channels selected in ascending order of index. The k physical channels may consist of only the second physical channels.

In the case where the first physical channel overlaps with a PUCCH transmission or a UCI transmission, the transmission on the first physical channel may be dropped, or the UCI may be mapped to the first physical channel and transmitted, using a combination of one or more of the methods described in section 1.3.

The PTRS associated with the first physical channel may be configured using a combination of one or more of the methods described in section 1.4.

In addition to the operations described with reference to FIGS. 4 and 5, a combination of one or more of the operations described with reference to FIGS. 1 to 3 and/or the operations described in section 1 may be further performed.

Example of Communication System to Which the Present Disclosure is Applied

The various descriptions, functions, procedures, proposals, methods, and/or operation flowcharts of the present disclosure described herein may be applied to, but not limited to, various fields requiring wireless communication/connectivity (e.g., 5G) between devices.

More specific examples will be described below with reference to the drawings. In the following drawings/description, like reference numerals denote the same or corresponding hardware blocks, software blocks, or function blocks, unless otherwise specified.

Figure 6:
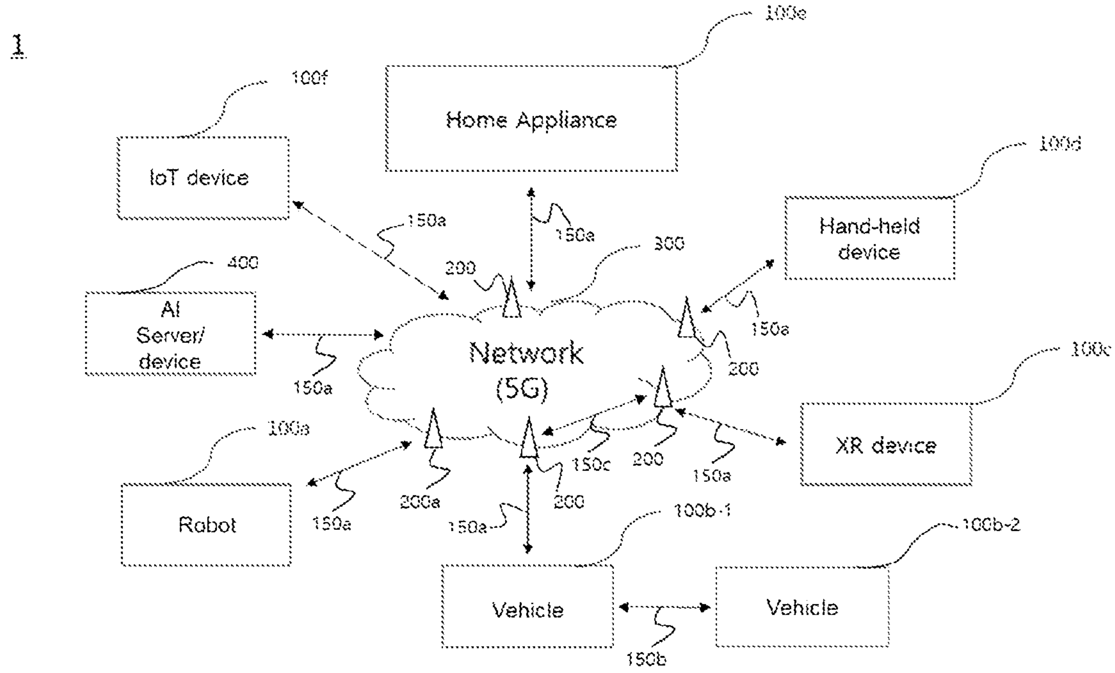
FIGS. 6 to 9 illustrate devices according to an embodiment of the present disclosure.

FIG. 6 illustrates a communication system 1 applied to the present disclosure.

Referring to FIG. 6, the communication system 1 applied to the present disclosure includes wireless devices, BSs, and a network. A wireless device is a device performing communication using radio access technology (RAT) (e.g., 5G NR (or New RAT) or LTE), also referred to as a communication/radio/5G device. The wireless devices may include, not limited to, a robot 100*a*, vehicles 100*b*-1 and 100*b*-2, an extended reality (XR) device 100*c*, a hand-held device 100*d*, a home appliance 100*e*, an IoT device 100*f*, and an artificial intelligence (AI) device/server 400. For example, the vehicles may include a vehicle having a wireless communication function, an autonomous driving vehicle, and a vehicle capable of vehicle-to-vehicle (V2V) communication. Herein, the vehicles may include an unmanned aerial vehicle (UAV) (e.g., a drone). The XR device may include an augmented reality (AR)/virtual reality (VR)/mixed reality (MR) device and may be implemented in the form of a head-mounted device (HMD), a head-up display (HUD) mounted in a vehicle, a television (TV), a smartphone, a computer, a wearable device, a home appliance, a digital signage, a vehicle, a robot, and so on. The hand-held device may include a smartphone, a smart pad, a wearable device (e.g., a smart watch or smart glasses), and a computer (e.g., a laptop). The home appliance may include a TV, a refrigerator, a washing machine, and so on. The IoT device may include a sensor, a smart meter, and so on. For example, the BSs and the network may be implemented as wireless devices, and a specific wireless device 200*a* may operate as a BS/network node for other wireless devices.

The wireless devices 100*a* to 100*f* may be connected to the network 300 via the BSs 200. An AI technology may be applied to the wireless devices 100*a* to 100*f*, and the wireless devices 100*a* to 100*f* may be connected to the AI server 400 via the network 300. The network 300 may be configured using a 3G network, a 4G (e.g., LTE) network, or a 5G (e.g., NR) network. Although the wireless devices 100*a* to 100*f* may communicate with each other through the BSs 200/network 300, the wireless devices 100*a* to 100*f* may perform direct communication (e.g., sidelink communication) with each other without intervention of the BSs/network. For example, the vehicles 100*b*-1 and 100*b*-2 may perform direct communication (e.g., V2V/vehicle-to-everything (V2X) communication). The IoT device (e.g., a sensor) may perform direct communication with other IoT devices (e.g., sensors) or other wireless devices 100*a* to 100*f*.

Wireless communication/connections 150*a*, 150*b*, and 150*c* may be established between the wireless devices 100*a* to 100*f*/BS 200 and between the BSs 200. Herein, the wireless communication/connections may be established through various RATs (e.g., 5G NR) such as UL/DL communication 150*a*, sidelink communication 150*b* (or, D2D communication), or inter-BS communication (e.g., relay or integrated access backhaul (IAB)). Wireless signals may be transmitted and received between the wireless devices, between the wireless devices and the BSs, and between the BSs through the wireless communication/connections 150*a*, 150*b*, and 150*c*. For example, signals may be transmitted and receive don various physical channels through the wireless communication/connections 150*a*, 150*b* and 150*c*. To this end, at least a part of various configuration information configuring processes, various signal processing processes (e.g., channel encoding/decoding, modulation/demodulation, and resource mapping/demapping), and resource allocation processes, for transmitting/receiving wireless signals, may be performed based on the various proposals of the present disclosure.

Example of Wireless Device to Which the Present Disclosure is Applied

Figure 7:
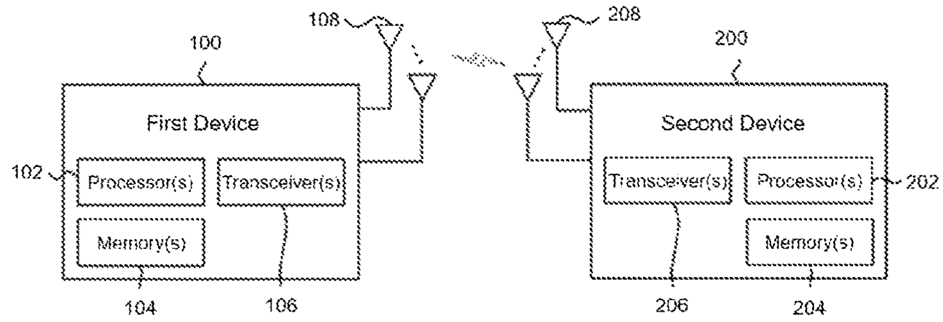

FIG. 7 illustrates wireless devices applicable to the present disclosure.

Referring to FIG. 7, a first wireless device 100 and a second wireless device 200 may transmit wireless signals through a variety of RATs (e.g., LTE and NR). {The first wireless device 100 and the second wireless device 200} may correspond to {the wireless device 100*x* and the BS 200} and/or {the wireless device 100*x* and the wireless device 100*x*} of FIG. 6.

The first wireless device 100 may include one or more processors 102 and one or more memories 104, and further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operation flowcharts disclosed in this document. For example, the processor(s) 102 may process information in the memory(s) 104 to generate first information/signals and then transmit wireless signals including the first information/signals through the transceiver(s) 106. The processor(s) 102 may receive wireless signals including second information/signals through the transceiver(s) 106 and then store information obtained by processing the second information/signals in the memory(s) 104. The memory(s) 104 may be connected to the processor(s) 102 and may store various pieces of information related to operations of the processor(s) 102. For example, the memory(s) 104 may store software code including instructions for performing all or a part of processes controlled by the processor(s) 102 or for performing the descriptions, functions, procedures, proposals, methods, and/or operation flowcharts disclosed in this document. The processor(s) 102 and the memory(s) 104 may be a part of a communication modem/circuit/chip designed to implement RAT (e.g., LTE or NR). The transceiver(s) 106 may be connected to the processor(s) 102 and transmit and/or receive wireless signals through the one or more antennas 108. Each of the transceiver(s) 106 may include a transmitter and/or a receiver. The transceiver(s) 106 may be interchangeably used with radio frequency (RF) unit(s). In the present disclosure, the wireless device may be a communication modem/circuit/chip.

The second wireless device 200 may include one or more processors 202 and one or more memories 204, and further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operation flowcharts disclosed in this document. For example, the processor(s) 202 may process information in the memory(s) 204 to generate third information/signals and then transmit wireless signals including the third information/signals through the transceiver(s) 206. The processor(s) 202 may receive wireless signals including fourth information/signals through the transceiver(s) 106 and then store information obtained by processing the fourth information/signals in the memory(s) 204. The memory(s) 204 may be connected to the processor(s) 202 and store various pieces of information related to operations of the processor(s) 202. For example, the memory(s) 204 may store software code including instructions for performing all or a part of processes controlled by the processor(s) 202 or for performing the descriptions, functions, procedures, proposals, methods, and/or operation flowcharts disclosed in this document. The processor(s) 202 and the memory(s) 204 may be a part of a communication modem/circuit/chip designed to implement RAT (e.g., LTE or NR). The transceiver(s) 206 may be connected to the processor(s) 202 and transmit and/or receive wireless signals through the one or more antennas 208. Each of the transceiver(s) 206 may include a transmitter and/or a receiver. The transceiver(s) 206 may be interchangeably used with RF unit(s). In the present disclosure, the wireless device may be a communication modem/circuit/chip.

Now, hardware elements of the wireless devices 100 and 200 will be described in greater detail. One or more protocol layers may be implemented by, not limited to, one or more processors 102 and 202. For example, the one or more processors 102 and 202 may implement one or more layers (e.g., functional layers such as physical (PHY), medium access control (MAC), radio link control (RLC), packet data convergence protocol (PDCP), RRC, and service data adaptation protocol (SDAP)). The one or more processors 102 and 202 may generate one or more protocol data units (PDUs) and/or one or more service data Units (SDUs) according to the descriptions, functions, procedures, proposals, methods, and/or operation flowcharts disclosed in this document. The one or more processors 102 and 202 may generate messages, control information, data, or information according to the descriptions, functions, procedures, proposals, methods, and/or operation flowcharts disclosed in this document and provide the messages, control information, data, or information to one or more transceivers 106 and 206. The one or more processors 102 and 202 may generate signals (e.g., baseband signals) including PDUs, SDUs, messages, control information, data, or information according to the descriptions, functions, procedures, proposals, methods, and/or operation flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operation flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. For example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in the one or more processors 102 and 202. The descriptions, functions, procedures, proposals, methods, and/or operation flowcharts disclosed in this document may be implemented using firmware or software, and the firmware or software may be configured to include the modules, procedures, or functions. Firmware or software configured to perform the descriptions, functions, procedures, proposals, methods, and/or operation flowcharts disclosed in this document may be included in the one or more processors 102 and 202 or may be stored in the one or more memories 104 and 204 and executed by the one or more processors 102 and 202. The descriptions, functions, procedures, proposals, methods, and/or operation flowcharts disclosed in this document may be implemented using firmware or software in the form of code, an instruction, and/or a set of instructions.

The one or more memories 104 and 204 may be connected to the one or more processors 102 and 202 and store various types of data, signals, messages, information, programs, code, instructions, and/or commands. The one or more memories 104 and 204 may be configured to include read-only memories (ROMs), random access memories (RAMs), electrically erasable programmable read-only memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or wireless signals/channels, mentioned in the methods and/or operation flowcharts of this document, to one or more other devices. The one or more transceivers 106 and 206 may receive user data, control information, and/or wireless signals/channels, mentioned in the descriptions, functions, procedures, proposals, methods, and/or operation flowcharts disclosed in this document, from one or more other devices. For example, the one or more transceivers 106 and 206 may be connected to the one or more processors 102 and 202 and transmit and receive wireless signals. For example, the one or more processors 102 and 202 may perform control so that the one or more transceivers 106 and 206 may transmit user data, control information, or wireless signals to one or more other devices. The one or more processors 102 and 202 may perform control so that the one or more transceivers 106 and 206 may receive user data, control information, or wireless signals from one or more other devices. The one or more transceivers 106 and 206 may be connected to the one or more antennas 108 and 208 and the one or more transceivers 106 and 206 may be configured to transmit and receive user data, control information, and/or wireless signals/channels, mentioned in the descriptions, functions, procedures, proposals, methods, and/or operation flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received wireless signals/channels from RF band signals into baseband signals in order to process received user data, control information, and wireless signals/channels using the one or more processors 102 and 202. The one or more transceivers 106 and 206 may convert the user data, control information, and wireless signals/channels processed using the one or more processors 102 and 202 from the baseband signals into the RF band signals. To this end, the one or more transceivers 106 and 206 may include (analog) oscillators and/or filters.

Example of Use of Wireless Device to Which the Present Disclosure is Applied

Figure 8:
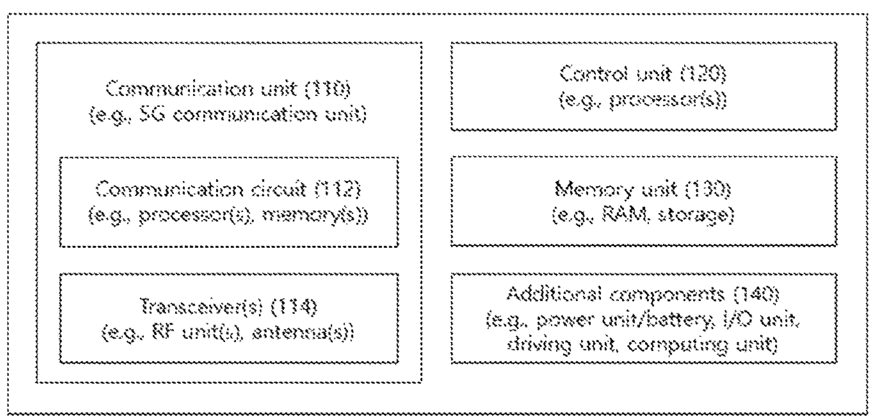

FIG. 8 illustrates another example of a wireless device applied to the present disclosure. The wireless device may be implemented in various forms according to a use case/service (refer to FIG. 6).

Referring to FIG. 8, wireless devices 100 and 200 may correspond to the wireless devices 100 and 200 of FIG. 7 and may be configured to include various elements, components, units/portions, and/or modules. For example, each of the wireless devices 100 and 200 may include a communication unit 110, a control unit 120, a memory unit 130, and additional components 140. The communication unit 110 may include a communication circuit 112 and transceiver(s) 114. For example, the communication circuit 112 may include the one or more processors 102 and 202 and/or the one or more memories 104 and 204 of FIG. 7. For example, the transceiver(s) 114 may include the one or more transceivers 106 and 206 and/or the one or more antennas 108 and 208 of FIG. 7. The control unit 120 is electrically connected to the communication unit 110, the memory 130, and the additional components 140 and provides overall control to the wireless device. For example, the control unit 120 may control an electric/mechanical operation of the wireless device based on programs/code/instructions/information stored in the memory unit 130. The control unit 120 may transmit the information stored in the memory unit 130 to the outside (e.g., other communication devices) via the communication unit 110 through a wireless/wired interface or store, in the memory unit 130, information received through the wireless/wired interface from the outside (e.g., other communication devices) via the communication unit 110.

The additional components 140 may be configured in various manners according to type of the wireless device. For example, the additional components 140 may include at least one of a power unit/battery, input/output (I/O) unit, a driving unit, and a computing unit. The wireless device may be implemented in the form of, not limited to, the robot (100*a* of FIG. 6), the vehicles (100*b*-1 and 100*b*-2 of FIG. 6), the XR device (100*c* of FIG. 6), the hand-held device (100*d* of FIG. 6), the home appliance (100*e* of FIG. 6), the IoT device (100*f* of FIG. 6), a digital broadcasting terminal, a hologram device, a public safety device, an MTC device, a medical device, a FinTech device (or a finance device), a security device, a climate/environment device, the AI server/device (400 of FIG. 6), the BSs (200 of FIG. 6), a network node, or the like. The wireless device may be mobile or fixed according to a use case/service.

In FIG. 8, all of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module in the wireless devices 100 and 200 may further include one or more elements. For example, the control unit 120 may be configured with a set of one or more processors. For example, the control unit 120 may be configured with a set of a communication control processor, an application processor, an electronic control unit (ECU), a graphical processing unit, and a memory control processor. In another example, the memory 130 may be configured with a RAM, a dynamic RAM (DRAM), a ROM, a flash memory, a volatile memory, a non-volatile memory, and/or a combination thereof.

Figure 9:
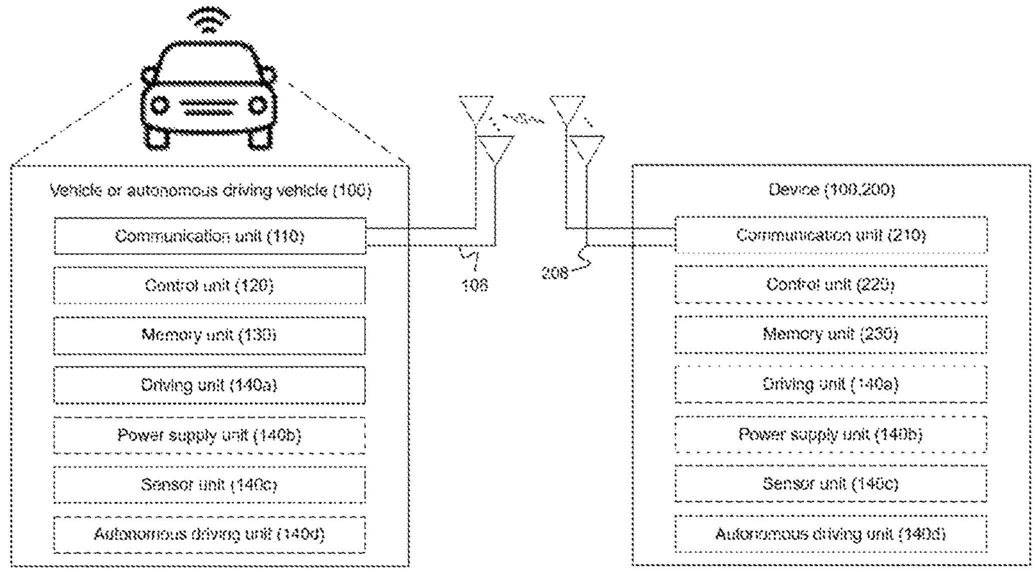

Example of Vehicle or Autonomous Driving Vehicle to Which the Present Disclosure is Applied FIG. 9 illustrates a vehicle or an autonomous driving vehicle applied to the present disclosure. The vehicle or autonomous driving vehicle may be implemented as a mobile robot, a car, a train, a manned/unmanned aerial vehicle (AV), a ship, or the like.

Referring to FIG. 9, a vehicle or autonomous driving vehicle 100 may include an antenna unit 108, a communication unit 110, a control unit 120, a driving unit 140*a*, a power supply unit 140*b*, a sensor unit 140*c*, and an autonomous driving unit 140*d*. The antenna unit 108 may be configured as a part of the communication unit 110. The blocks 110/130/140*a* to 140*d* correspond to the blocks 110/130/140 of FIG. 8, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous driving vehicle 100. The control unit 120 may include an ECU. The driving unit **140*a* may enable the vehicle or the autonomous driving vehicle 100 to drive on a road. The driving unit 140*a* may include an engine, a motor, a powertrain, a wheel, a brake, a steering device, and so on. The power supply unit 140*b* may supply power to the vehicle or the autonomous driving vehicle 100 and include a wired/wireless charging circuit, a battery, and so on. The sensor unit 140*c* may acquire information about a vehicle state, ambient environment information, user information, and so on. The sensor unit 140*c* may include an inertial measurement unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, and so on. The autonomous driving unit 140*d*** may implement technology for maintaining a lane on which the vehicle is driving, technology for automatically adjusting speed, such as adaptive cruise control, technology for autonomously driving along a determined path, technology for driving by automatically setting a route if a destination is set, and the like.

For example, the communication unit 110 may receive map data, traffic information data, and so on from an external server. The autonomous driving unit **140*d* may generate an autonomous driving route and a driving plan from the obtained data. The control unit 120 may control the driving unit 140*a* such that the vehicle or autonomous driving vehicle 100 may move along the autonomous driving route according to the driving plan (e.g., speed/direction control). During autonomous driving, the communication unit 110 may aperiodically/periodically acquire recent traffic information data from the external server and acquire surrounding traffic information data from neighboring vehicles. During autonomous driving, the sensor unit 140*c* may obtain information about a vehicle state and/or surrounding environment information. The autonomous driving unit 140*d* may update the autonomous driving route and the driving plan based on the newly obtained data/information. The communication unit 110** may transfer information about a vehicle position, the autonomous driving route, and/or the driving plan to the external server. The external server may predict traffic information data using AI technology based on the information collected from vehicles or autonomous driving vehicles and provide the predicted traffic information data to the vehicles or the autonomous driving vehicles.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

As described above, the present disclosure is applicable to various wireless communication systems.

What is claimed is:

1. A method comprising:

receiving downlink control information (DCI) for scheduling a plurality of physical channels, wherein a first resource allocated for at least one first physical channel among the plurality of physical channels does not include a demodulation reference signal (DMRS), and a second resource allocated for at least one second physical channel among the plurality of physical channels includes a DMRS;

transmitting or receiving the first physical channel on the first resource based on the DCI; and transmitting or receiving the second physical channel on the second resource based on the DCI, wherein a first transport block size (TBS) of the first physical channel is determined based on the number of resource elements (REs) containing data within the first physical channel (N_RE1) and the number of layers of the first physical channel (V1), and wherein a second TBS of the second physical channel is determined based on the number of REs containing data within the second physical channel (N_RE2) and the number of layers of the second physical channel (V2), wherein, based on the first physical channel and the second physical channel being transmitted through transport block (TB) repetition, the V1 and the V2 are set to a same value, and wherein, based on the first physical channel and the second physical channel containing different TBs, the V1 and the V2 are set independently.

2. The method of claim 1, wherein the DCI contains information for indicating the V1.

3. The method of claim 1, wherein the information for indicating the V1 in the DCI is information for an antenna port for the second physical channel.

4. The method of claim 1, wherein a default V (V0) and a common V (Vc) are set for the plurality of physical channels, wherein the V1 is set to one of the V0 and the Vc, and wherein the V2 set through information for an antenna port in the DCI.

5. The method of claim 1, wherein the V1 and V2 are set to a same value, based on the first resource not including the DMRS.

6. The method of claim 1, wherein the N_RE1 and the N_RE2 are determined based on a common N_RE(Nc) for the plurality of physical channels, wherein, based on the number of the at least one second physical channel being greater than 1, the Nc is determined based on at least one of an average, a maximum, or a minimum of a plurality of values of the N_RE2, wherein, based on the at least one first physical channel being greater than 1, the Nc is determined based on at least one of an average, a maximum, or a minimum of a plurality of values of the N_RE1.

7. The method of claim 1, wherein, the N_RE1 and the N_RE2 are determined based on a common N_RE(Nc) for the plurality of physical channels, wherein, based the number of the at least one first physical channel being less than a threshold T, the Nc is determined based on the N_RE2, and wherein, based the number of the at least one first physical channel being greater than or equal to the threshold T, the Nc is determined based on the N_RE1.

8. The method of claim 1, wherein, based on the first physical channel and the second physical channel being transmitted through transport block (TB) repetition, the N_RE1 and the N_RE2 are determined based on the number of REs in each of k preceding physical channels in a time domain among the plurality of physical channels.

9. The method of claim 1, wherein the N_RE1 is determined based on a lesser one between 168 and N'_RE1, wherein the N'_RE1 is determined based on:

the number of subcarriers per resource block (RB) (n^RB_sc);

the number of symbols allocated in a slot for the first physical channel (N^sh_symb1);

the number of DMRS REs per PRB in a scheduled interval including overhead of DMRS CDM groups without data for the first physical channel (N^PRB_DMRS1); and overhead (N^PRB_oh1) set by a higher layer parameter for the first physical channel, wherein the N_RE2 is determined based on a lesser one between 156 and N'_RE2, wherein the N'_RE2 is determined based on:

the number of subcarriers per RB (n^RB_sc);

the number of symbols allocated in a slot for the second physical channel (N^sh_symb2);

the number of DMRS REs per PRB in a scheduled interval including overhead of DMRS CDM groups without data for the second physical channel (N^PRB_DMRS2); and overhead (N^PRB_oh2) set by a higher layer parameter for the second physical channel, wherein the N^PRB_DMRS1 is 0, and wherein the N^PRB_oh1 is set independently of the N^PRB_oh2.

10. The method of claim 9, wherein the N^PRB_oh1 is set by applying an offset value to the N^PRB_oh2.

11. A terminal comprising:

at least one transceiver;

at least one processor; and at least one memory operatively connected to the at least one processor and storing instructions that, when executed, cause the at least one processor to perform a specific operation, wherein the specific operation comprises:

receiving downlink control information (DCI) for scheduling a plurality of physical channels, wherein a first resource allocated for at least one first physical channel among the plurality of physical channels does not include a demodulation reference signal (DMRS), and a second resource allocated for at least one second physical channel among the plurality of physical channels includes a DMRS;

transmitting or receiving the first physical channel on the first resource based on the DCI; and transmitting or receiving the second physical channel on the second resource based on the DCI, wherein a first transport block size (TBS) of the first physical channel is determined based on the number of resource elements (REs) containing data within the first physical channel (N_RE1) and the number of layers of the first physical channel (V1), and wherein a second TBS of the second physical channel is determined based on the number of REs containing data within the second physical channel (N_RE2) and the number of layers of the second physical channel (V2), wherein, based on the first physical channel and the second physical channel being transmitted through transport block (TB) repetition, the V1 and the V2 are set to a same value, and wherein, based on the first physical channel and the second physical channel containing different TBs, the V1 and the V2 are set independently.

12. A base station comprising:

at least one transceiver;

at least one processor; and at least one memory operatively connected to the at least one processor and storing instructions that, when executed, cause the at least one processor to perform a specific operation, wherein the specific operation comprises:

transmitting DCI downlink control information (DCI) for scheduling a plurality of physical channels, wherein a first resource allocated for at least one first physical channel among the plurality of physical channels does not include a demodulation reference signal (DMRS), and a second resource allocated for at least one second physical channel among the plurality of physical channels includes a DMRS;

transmitting or receiving the first physical channel on the first resource based on the DCI; and transmitting or receiving the second physical channel on the second resource based on the DCI, wherein a first transport block size (TBS) of the first physical channel is determined based on the number of resource elements (REs) containing data within the first physical channel (N_RE1) and the number of layers of the first physical channel (V1), and wherein a second TBS of the second physical channel is determined based on the number of REs containing data within the second physical channel (N_RE2) and the number of layers of the second physical channel (V2), wherein, based on the first physical channel and the second physical channel being transmitted through transport block (TB) repetition, the V1 and the V2 are set to a same value, and wherein, based on the first physical channel and the second physical channel containing different TBs, the V1 and the V2 are set independently.

* * * * *